(12) United States Patent
Chatterjee et al.

(10) Patent No.: US 11,763,429 B2
(45) Date of Patent: Sep. 19, 2023

(54) DEEP LEARNING BASED MEDICAL SYSTEM AND METHOD FOR IMAGE ACQUISITION

(71) Applicant: GE Precision Healthcare LLC, Wauwatosa, WI (US)

(72) Inventors: Sudhanya Chatterjee, Bangalore (IN); Dattesh Dayanand Shanbhag, Bangalore (IN)

(73) Assignee: GE Precision Healthcare LLC, Wauwatosa, WI (US)

(*) Notice: Subject to any disclaimer, the term of this patent is extended or adjusted under 35 U.S.C. 154(b) by 253 days.

(21) Appl. No.: 17/325,010

(22) Filed: May 19, 2021

(65) Prior Publication Data
US 2022/0375035 A1    Nov. 24, 2022

(51) Int. Cl.
*G06K 9/00*    (2022.01)
*G06T 5/00*    (2006.01)
*G06T 7/00*    (2017.01)
*G06N 3/08*    (2023.01)

(52) U.S. Cl.
CPC ............. *G06T 5/002* (2013.01); *G06N 3/08* (2013.01); *G06T 7/0002* (2013.01); *G06T 2207/10088* (2013.01); *G06T 2207/20081* (2013.01); *G06T 2207/20084* (2013.01)

(58) Field of Classification Search
CPC .......... G06T 5/002; G06T 7/0002; G06T 2207/10088; G06T 2207/20081; G06T 2207/20084; G06N 3/08

USPC ........................................................ 382/131
See application file for complete search history.

(56) References Cited

U.S. PATENT DOCUMENTS

| | | | |
|---|---|---|---|
| 10,565,686 B2 | 2/2020 | Lehtinen | |
| 2019/0004132 A1 | 1/2019 | Tan | |
| 2019/0347772 A1 | 11/2019 | Zhang | |
| 2021/0104021 A1* | 4/2021 | Sohn | ........................ G06N 3/045 |
| 2022/0198725 A1* | 6/2022 | Litwiller | ............ G01R 33/5608 |
| 2022/0248972 A1* | 8/2022 | Wang | .................... A61B 5/7267 |

OTHER PUBLICATIONS

Kawamura, Motohide, et al. "Accelerated acquisition of high-resolution diffusion-weighted imaging of the brain with a multi-shot echo-planar sequence: deep-learning-based denoising." Magnetic Resonance in Medical Sciences 20.1 (2021): 99. (Year: 2021).*

(Continued)

*Primary Examiner* — Jonathan S Lee (57) ABSTRACT

A medical imaging system having at least one medical imaging device providing image data of a subject is provided. The medical imaging system further includes a processing system programmed to train a deep learning (DL) network using a plurality of training images to predict noise in input data. The plurality of training images includes a plurality of excitation (NEX) images acquired for each line of k-space training data. The processing system is further programmed to use the trained DL network to determine noise in the image data of the subject and to generate a denoised medical image of the subject having reduced noise based on the determined noise in the image data.

12 Claims, 9 Drawing Sheets

(56) References Cited

OTHER PUBLICATIONS

Huang, Mengxing, et al. "Image Noise Recognition Algorithm Based on Improved DenseNet." Web Information Systems and Applications: 18th International Conference, WISA 2021, Kaifeng, China, Sep. 24-26, 2021, Proceedings 18. Springer International Publishing, 2021. (Year: 2021).*

Jifara, Worku, et al. "Medical image denoising using convolutional neural network: a residual learning approach." The Journal of Supercomputing 75 (2019): 704-718. (Year: 2019).*

Ke, Ziwen, Yanjie Zhu, and Dong Liang. "Cascaded residual dense networks for dynamic MR imaging with edge-enhanced loss constraint." Investigative Magnetic Resonance Imaging 24.4 (2020): 214-222. (Year: 2020).*

Song, Yuda, Yunfang Zhu, and Xin Du. "Dynamic residual dense network for image denoising." Sensors 19.17 (2019): 3809. (Year: 2019).*

Xiang, Lei, et al. "Deep-learning-based multi-modal fusion for fast MR reconstruction." IEEE Transactions on Biomedical Engineering 66.7 (2018): 2105-2114. (Year: 2018).*

Zhang, Kai, et al. "Beyond a gaussian denoiser: Residual learning of deep cnn for image denoising." IEEE transactions on image processing 26.7 (2017): 3142-3155. (Year: 2017).*

Zheng, Hao, Faming Fang, and Guixu Zhang. "Cascaded dilated dense network with two-step data consistency for MRI reconstruction." Advances in Neural Information Processing Systems 32 (2019). (Year: 2019).*

Huang et al., "Densely Connected Convolutional Networks," Aug. 25, 2016, arXiv:1608.06993v5 [cs.CV], 9 pages.

Lehtinen et al., "Noise2Noise: Learning Image Restoration without Clean Data," arXiv:1803.04189v3 [cs.CV], Mar. 12, 2018, 12 pages.

* cited by examiner

DEEP LEARNING BASED MEDICAL SYSTEM AND METHOD FOR IMAGE ACQUISITION

BACKGROUND

The field of the disclosure relates generally to medical imaging systems and methods, and more particularly, to techniques of de-noising magnetic resonance (MR) images using a deep learning (DL) network.

In modern healthcare facilities, non-invasive medical imaging systems are often used for identifying, diagnosing, and treating physical conditions. Medical imaging encompasses different non-invasive techniques used to image and visualize the internal structures and/or functional behavior (such as chemical or metabolic activity) of organs and tissues within a patient. Currently, a number of modalities of medical diagnostic and imaging systems exist, each typically operating on different physical principles to generate different types of images and information. These modalities include ultrasound systems, computed tomography (CT) systems, X-ray systems (including both conventional and digital or digitized imaging systems), positron emission tomography (PET) systems, single photon emission computed tomography (SPECT) systems, and magnetic resonance (MR) imaging systems.

Magnetic resonance imaging (MRI) has proven useful in diagnosis of many diseases. MRI provides detailed images of soft tissues, abnormal tissues such as tumors, and other structures, which cannot be readily imaged by other imaging modalities, such as computed tomography (CT). Further, MRI operates without exposing patients to ionizing radiation experienced in modalities such as CT and x-rays.

MR images are inherently noisy due to a range of phenomenon in the signal and acquisition hardware chain. Noisy images can impact the ability to make decisions from the MR images. Therefore, there is a need for an improved magnetic resonance imaging system and method.

BRIEF DESCRIPTION

In accordance with an embodiment of the present technique a medical imaging system is provided. The medical imaging system includes at least one medical imaging device that provides image data of a subject and a processing system. The processing system is programmed to train a deep learning (DL) network using a plurality of training images to predict noise in input data. The plurality of training images includes a plurality of excitation (NEX) images acquired for each line of k-space training data. The processing system is further programmed to use the trained DL network to determine noise in the image data of the subject; and to generate a denoised medical image of the subject having reduced noise based on the determined noise in the image data.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present embodiments, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments. Furthermore, the terms "circuit" and "circuitry" and "controller" may include either a single component or a plurality of components, which are either active and/or passive and are connected or otherwise coupled together to provide the described function.

In magnetic resonance imaging (MRI), an object is placed in a magnet. When the object is in the magnetic field generated by the magnet, magnetic moments of nuclei, such as protons, attempt to align with the magnetic field but process about the magnetic field in a random order at the nuclei's Larmor frequency. The magnetic field of the magnet is referred to as B0 and extends in the longitudinal or z direction. In acquiring a MR image, a magnetic field (referred to as an excitation field B1), which is in the x-y plane and near the Larmor frequency, is generated by a radio-frequency (RF) coil and may be used to rotate, or "tip," the net magnetic moment $M_z$ of the nuclei from the z direction to the transverse or x-y plane. A signal, which is referred to as a MR signal, is emitted by the nuclei, after the excitation signal B1 is terminated. To use the MR signals to generate an image of an object, magnetic field gradient pulses ($G_x$, $G_y$, and $G_z$) are used. The gradient pulses are used to scan through the k space, the space of spatial frequencies or inverse of distances. A Fourier relationship exists between the acquired MR signals and an image of the object, and therefore the image of the object can be derived by reconstructing the MR signals. The images of the object may include two dimensional (2D) or three-dimensional (3D) images.

The embodiments presented herein are related to a deep learning (DL) based technique for de-noising MR images. The technique is based on estimating noise realization obtained from multiple noise samples (i.e. noise distribution realizations) from repeated image acquisitions. The present technique preserves mean signal intensity and maintains visual acuity even of the tiniest structures; thereby making it suitable for both quantitative and anatomical image denoising.

Figure 1:
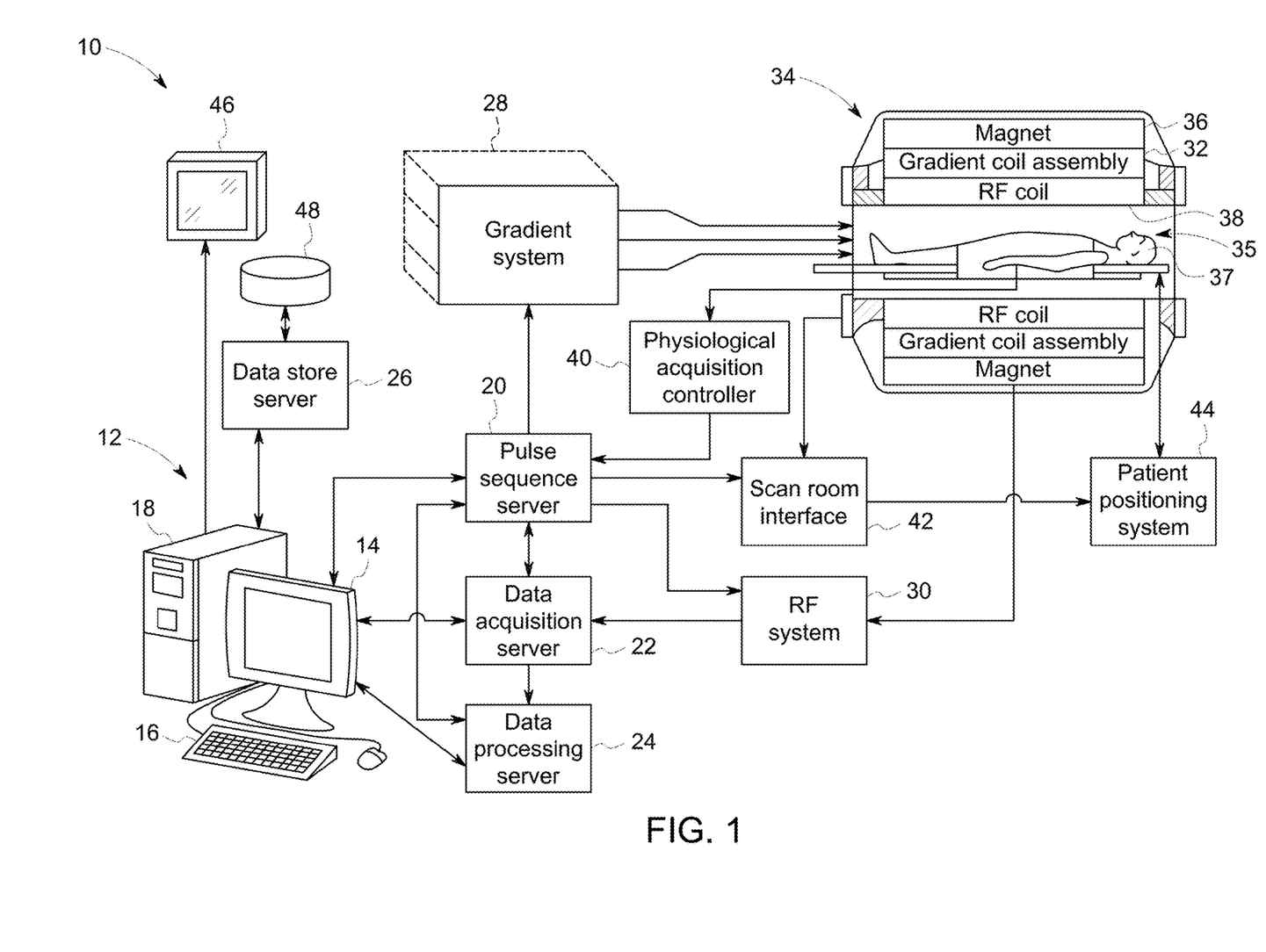
FIG. 1 is a schematic diagram of an exemplary magnetic resonance imaging (MRI) system in accordance with an embodiment of the present technique.

FIG. 1 illustrates a schematic diagram of an exemplary MRI system 10. In the exemplary embodiment, the MRI system 10 includes a workstation 12 having a display 14 and a keyboard 16. The workstation 12 includes a processor 18, such as a commercially available programmable machine running a commercially available operating system. The workstation 12 provides an operator interface that allows scan prescriptions to be entered into the MRI system 10. The workstation 12 is coupled to a pulse sequence server 20, a data acquisition server 22, a data processing server 24, and a data store server 26. The workstation 12 and each server 20, 22, 24, and 26 communicate with each other.

In the exemplary embodiment, the pulse sequence server 20 responds to instructions downloaded from the workstation 12 to operate a gradient system 28 and a radiofrequency ("RF") system 30. The instructions are used to produce gradient and RF waveforms in MR pulse sequences. An RF coil 38 and a gradient coil assembly 32 are used to perform the prescribed MR pulse sequence. The RF coil 38 is shown as a whole body RF coil. The RF coil 38 may also be a local coil that may be placed in proximity to the anatomy to be imaged, or a coil array that includes a plurality of coils.

In the exemplary embodiment, gradient waveforms used to perform the prescribed scan are produced and applied to the gradient system 28, which excites gradient coils in the gradient coil assembly 32 to produce the magnetic field gradients $G_x$, $G_y$, and $G_z$ used for position-encoding MR signals. The gradient coil assembly 32 forms part of a magnet assembly 34 that also includes a polarizing magnet 36 and the RF coil 38.

In the exemplary embodiment, the RF system 30 includes an RF transmitter for producing RF pulses used in MR pulse sequences. The RF transmitter is responsive to the scan prescription and direction from the pulse sequence server 20 to produce RF pulses of a desired frequency, phase, and pulse amplitude waveform. The generated RF pulses may be applied to the RF coil 38 by the RF system 30. Responsive MR signals detected by the RF coil 38 are received by the RF system 30, amplified, demodulated, filtered, and digitized under direction of commands produced by the pulse sequence server 20. The RF coil 38 is described as a transmitter and receiver coil such that the RF coil 38 transmits RF pulses and detects MR signals. In one embodiment, the MRI system 10 may include a transmitter RF coil that transmits RF pulses and a separate receiver RF coil that detects MR signals. A transmission channel of the RF system 30 may be connected to a RF transmission coil and a receiver channel may be connected to a separate RF receiver coil. Often, the transmission channel is connected to the whole body RF coil 38 and each receiver section is connected to a separate local RF coil.

In the exemplary embodiment, the RF system 30 also includes one or more RF receiver channels. Each RF receiver channel includes an RF amplifier that amplifies the MR signal received by the RF coil 38 to which the channel is connected, and a detector that detects and digitizes the I and Q quadrature components of the received MR signal. The magnitude of the received MR signal may then be determined as the square root of the sum of the squares of the I and Q components as in Eq. (1) below:

$$M = \sqrt{I^2 + Q^2} \qquad (1);$$

and the phase of the received MR signal may also be determined as in Eq. (2) below:

$$\varphi = \tan^{-1}\left(\frac{Q}{I}\right). \qquad (2)$$

In the exemplary embodiment, the digitized MR signal samples produced by the RF system 30 are received by the data acquisition server 22. The data acquisition server 22 may operate in response to instructions downloaded from the workstation 12 to receive real-time MR data and provide buffer storage such that no data is lost by data overrun. In some scans, the data acquisition server 22 does little more than pass the acquired MR data to the data processing server 24. In scans that need information derived from acquired MR data to control further performance of the scan, however, the data acquisition server 22 is programmed to produce the needed information and convey it to the pulse sequence server 20. For example, during prescans, MR data is acquired and used to calibrate the pulse sequence performed by the pulse sequence server 20. Also, navigator signals may be acquired during a scan and used to adjust the operating parameters of the RF system 30 or the gradient system 28, or to control the view order in which k-space is sampled.

In the exemplary embodiment, the data processing server 24 receives MR data from the data acquisition server 22 and processes it in accordance with instructions downloaded from the workstation 12. Such processing may include, for example, Fourier transformation of raw k-space MR data to produce two or three-dimensional images, the application of filters to a reconstructed image, the performance of a back-projection image reconstruction of acquired MR data, removal of artifacts in the MR data, the generation of functional MR images, and the calculation of motion or flow images.

In the exemplary embodiment, images reconstructed by the data processing server 24 are conveyed back to, and stored at, the workstation 12. In some embodiments, real-time images are stored in a database memory cache (not shown in FIG. 1), from which they may be output to operator display 14 or a display 46 that is located near the magnet assembly 34 for use by attending physicians. Batch mode images or selected real time images may be stored in a host database on disc storage 48 or on a cloud. When such images have been reconstructed and transferred to storage, the data processing server 24 notifies the data store server 26. The workstation 12 may be used by an operator to archive the images, produce films, or send the images via a network to other facilities.

As discussed earlier, the acquired MR data from the data acquisition server 22 may include artifacts due to pathology condition of the subject such as metal implants or fractures in a human body. Using deep learning to directly remove these artifacts provides superior performance to conventional methods.

Figure 2A:
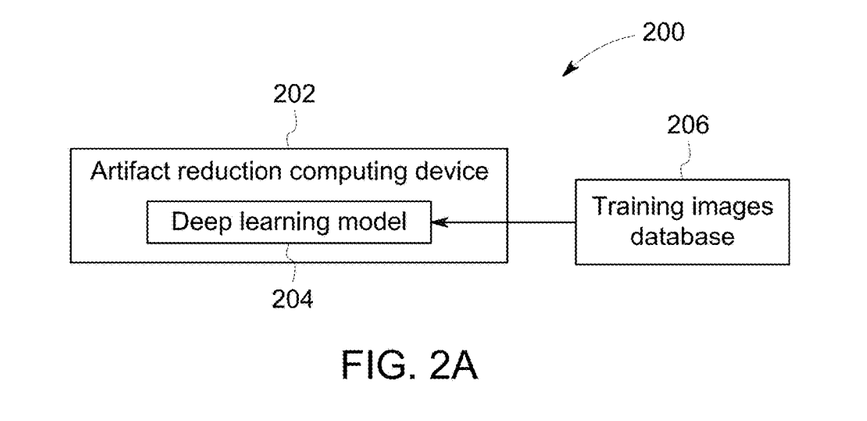
FIG. 2A is an exemplary truncation artifact reduction/classifier system which is used in the MRI system of FIG. 1.

FIG. 2A is a schematic diagram of an exemplary artifact reduction system 200 which is used in MRI system 10 of FIG. 1. In the exemplary embodiment, the system 200 includes a computing device 202 which is configured to reduce artifacts in the medical images. The computing device 202 includes a DL network model 204 and a training images database 206. The training images from the training images database 206 are ground truth images obtained historically or in real time before acquiring the main scan and are used to train the DL network model 204. In one embodiment, a technique to train the DL network model 204 is presented herewith. The computing device 202 may then use the trained DL network model 204 to generate medical images with reduced artifact. The computing device 202 may be included in the workstation 12 of the MRI system 10, or may be included on a separate computing device that is in communication with the workstation 12.

Figure 2B:
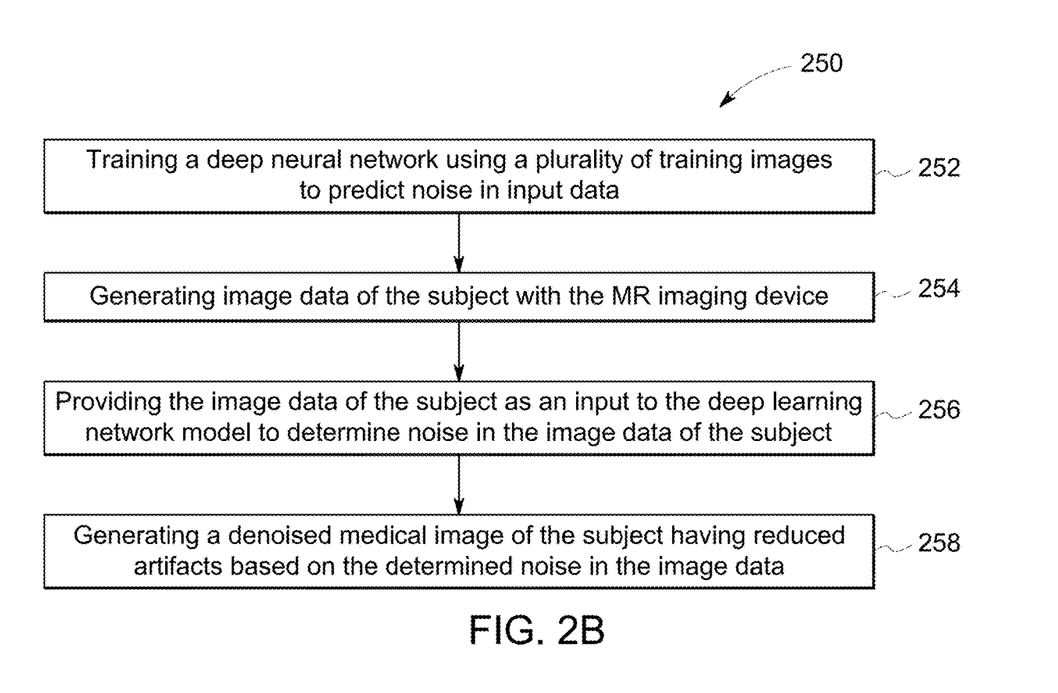
FIG. 2B is a flow chart of an exemplary method that may be implemented in system of FIG. 2A in accordance with an embodiment of the present technique.

FIG. 2B is a flow chart of an exemplary method 250. The method 250 may be implemented on the artifact reduction system 200. In the exemplary embodiment, the method includes training 252 a DL network using a plurality of training images to predict noise in input data of the DL network. The plurality of training images includes a plurality of excitation images also called herein as number of excitations (NEX) images acquired for each line of k-space training data using the MR imaging device. As will be appreciated by those skilled in the art, the NEX help in improving signal to noise ratio (SNR) for the MRI system 10 as the amount of data received for the image goes up which is then averaged. For example, doubling the NEX for each line of k-space improves the SNR by square root of two ($\sqrt{2}$). The plurality of training images may be stored in a historical image database of the same patient or of various pathologies of different patients from which these images may be acquired when required. In one embodiment, training the DL network includes providing a pair of training images (one as an input NEX image and the another a noise realization in the input image derived from another NEX image) to the DL network to determining noise between that pair of NEX images among the plurality of NEX images.

The method 250 further includes generating image data of the subject with the MR imaging device at step 254. As used herein, a subject is a human (or patient), an animal, or a phantom. In other words, during medical scanning of the patient, image data of the patient anatomy may be obtained during step 254. Further, at step 256, the method includes providing the obtained image data of the subject as an input to the deep learning network model that has been trained in step 252 to determine noise in the image data. At step 258, a denoised medical image of the subject is generated. The denoised medical image basically contains reduced artifacts and is generated based on the determined noise in the image data at step 256. In one embodiment, generating the denoised medical image comprises subtracting the noise of the image data from the image data of the subject.

Figure 3:
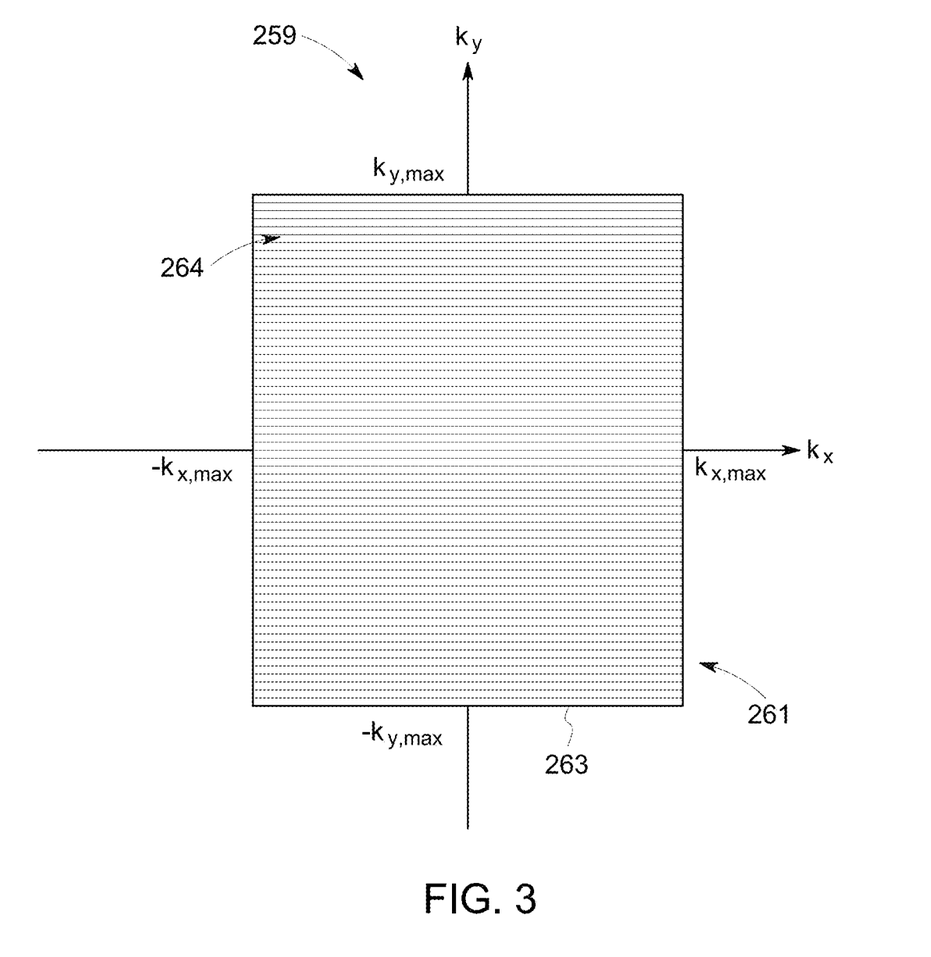
FIG. 3 is a schematic diagram of a k-space sampling, in accordance with an embodiment of the present technique.

FIG. 3 is a schematic diagram of a sampling pattern 259 of an example k-space training data 261. A full k-space 261 is defined by the maximum kx or ky values $k_{x,max}$ and $k_{x,max}$, which is defined by maximum frequency- or phase-encoding gradients. In general, k-space 261 represents raw data directly obtained from the MR signal wherein the k-space kx-ky values correspond to spatial frequencies of the MR image. As discussed earlier, in one embodiment of the present technique, a plurality of excitation (NEX) images are acquired for each line 263 of k-space training data. In one embodiment, the k-space training data that is obtained is only a partial k-space data. In other words, in one embodiment, part of the high spatial frequency data 263 is not acquired rather truncated data is acquired. The truncation may be in the kx dimension and/or the ky dimension, and may be in the kz dimension in a three-dimension (3D) acquisition. The full k-space 261 is truncated into a partial k-space. The truncation may be symmetrical or asymmetrical, i.e., the k-space may be truncated symmetrically in both dimensions or asymmetrically in one dimension.

Figure 4:
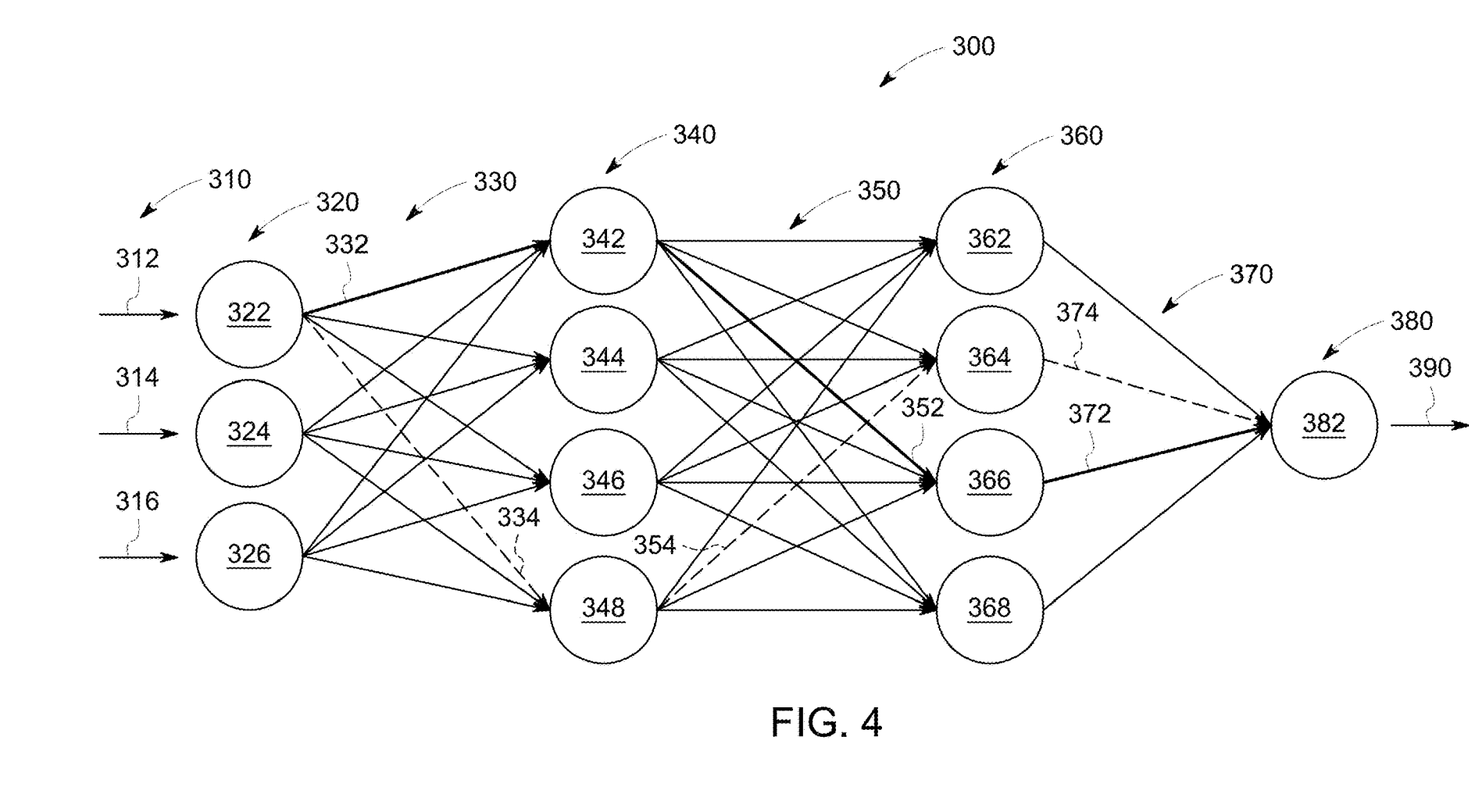
FIG. 4 is a schematic diagram of an example DL network that may be used in the truncation artifact reduction system of FIG. 2A.

FIG. 4 is a representation of an example DL network model 300 that may be used as the DL network model 204 in the embodiment of 200 to reduce artifacts due to medical conditions of the patient. The example DL network model 300 includes layers 320, 340, 360, and 380. The layers 320 and 340 are connected with neural connections 330. The layers 340 and 360 are connected with neural connections 350. The layers 360 and 380 are connected with neural connections 370. Data flows forward via inputs 312, 314, 316 from the input layer 320 to the output layer 380 and to an output 390. The inputs 312, 314, 316 may be source and target images and output 390 may be final output image. For example, in one embodiment, the inputs 312, 314 and 316 may be the plurality of NEX images and target noise obtained for the k-space training data and output 390 may be the noise determined by the DL network.

The layer 320 is an input layer that, in the example of FIG. 3, includes a plurality of nodes 322, 324, 326. The layers 340 and 360 are hidden layers and include, the example of FIG. 3, nodes 342, 344, 346, 348, 362, 364, 366, 368. The DL network model 300 may include more or less hidden layers 340 and 360 than shown. The layer 380 is an output layer and includes, in the example of FIG. 3 a node 382 with an output 390. Each input 312-316 corresponds to a node 322-326 of the input layer 320, and each node 322-326 of the input layer 320 has a connection 330 to each node 342-348 of the hidden layer 340. Each node 342-348 of the hidden layer 340 has a connection 350 to each node 362-368 of the hidden layer 360. Each node 362-368 of the hidden layer 360 has a connection 370 to the output layer 380. The output layer 380 has an output 390 to provide an output from the example DL network model 300.

Of connections 330, 350, and 370 certain example connections 332, 352, 372 may be given added weight while other example connections 334, 354, 374 may be given less weight in the DL network model 300. Input nodes 322-326 are activated through receipt of input data via inputs 312-316, for example. Nodes 342-348 and 362-368 of hidden layers 340 and 360 are activated through the forward flow of data through the network model 300 via the connections 330 and 350, respectively. Node 382 of the output layer 380 is activated after data processed in hidden layers 340 and 360 is sent via connections 370. When the output node 382 of the output layer 380 is activated, the node 382 outputs an appropriate value based on processing accomplished in hidden layers 340 and 360 of the DL network model 300.

Figure 5:
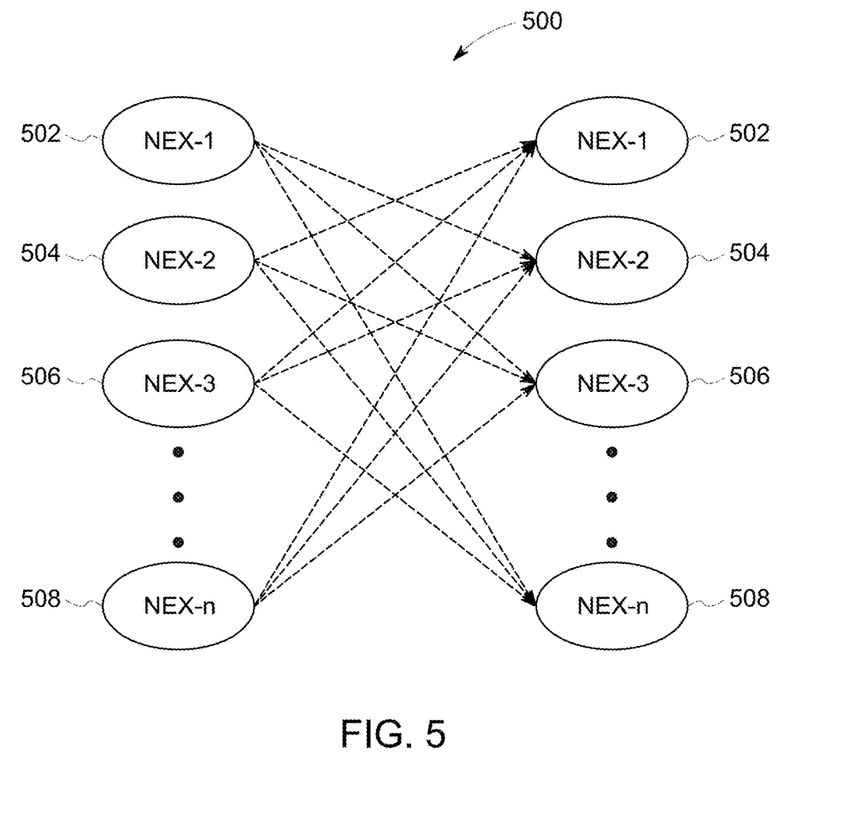
FIG. 5 is a schematic diagram of a plurality of training images that may be used to train the DL network model of FIG. 4.

FIG. 5 is a schematic diagram 500 showing a plurality of training images that may be used to train the DL network model of FIG. 4. As discussed earlier, the plurality of training images includes a plurality of excitation images or NEX images acquired for each line of k-space training data using the MR imaging device. Further, the plurality of training images includes noise realized from the NEX images as will be described below.

For example, each of the NEX images includes some intrinsic noise i.e., no noise is added externally to it. Assume there are total n NEX images—NEX1 502, NEX2 504, NEX3 506 and so on till NEXn 508, each of which include intrinsic noise N1, N2, N3 to Nn respectively. Also assume that image NEX1 502 can be represented as (x+N1) where x represents the clean image of the subject that is being scanned and N1 is the noise in the image NEX1. Further NEX2 504 can be represented as (x+N2) where N2 is the noise in the image NEX2. After subtracting NEX2 from NEX1, we get:

$$NEX1-NEX2=(x+N1)-(x+N2)=N1-N2 \quad (1)$$

Thus, Equation (1) gives one example of noise realization or a true noise factor for the MRI scan from the NEX images. The above process may be repeated for every pair of NEX images. For example, in FIG. 5, the image NEX1 has (n−1) other images NEX2 to NEXn with which it can be paired. Similarly, NEX2, NEX3 and all other images can be paired with each other and these images along with their noise realization or factors can be used as training images for training the DL network. For example, NEX1 images can be used as an input image and the noise factor N1-N2 can be used as a target image or target noise for training the DL network. Thus, the trained DL network will then determine the noise for each input image.

As discussed above, for training the DL network, the NEX images may be provided as input images and noise realizations from these NEX images may be provided as target images. However, in in some embodiments, instead of using the noise as target image, one of the NEX image of the pair of NEX images can be used as target image for the DL network and other NEX image of the pair can be used as input image for the DL network. Since noise is affected by b-value indicating the intensity of gradients used to generate diffusion-weighted images (DWI), in one embodiment, separate training images for b=0 and b=800 (or other values) are obtained. For example: for b=800, 12 NEX images acquired i.e., n=12 in FIG. 5. Hence, for each NEX image, there are 11 training pairs with true noise realizations. Therefore, there are 11×11=121 training image pairs (i.e. (NEX−1)×(NEX−1)) per case. Thus, this approach helps in overcoming the data insufficiency challenge as well. It should be noted that although the above description applies to DWI MRI, the presented technique can also be equally applied to any other type MRI imaging. For example, the results of the presented technique as applied to a structural MRI technique will be discussed in subsequent paragraphs.

Figure 6:
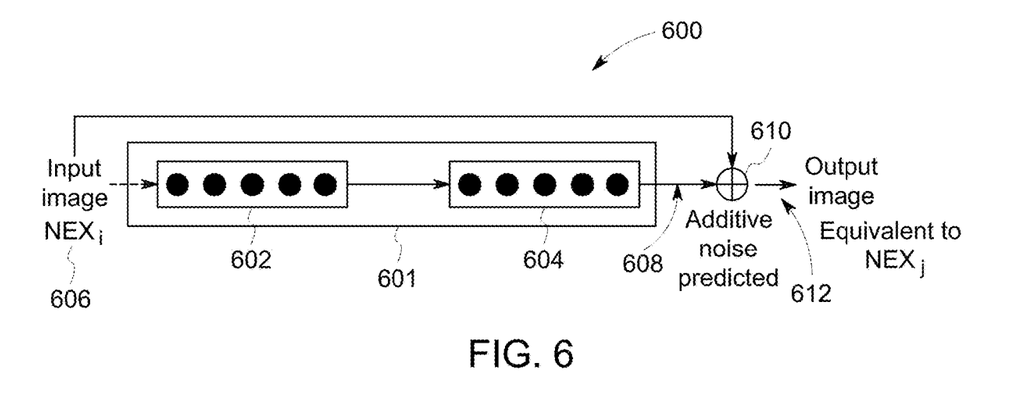
FIG. 6 is a schematic diagram depicting a DL network system used for predicting in accordance with an embodiment of the present technique.

FIG. 6 is a schematic diagram of a DL network system 600 used for predicting noise. The DL network system comprises a DL network 601 having two Dense Blocks 602 and 604 that are cascaded to predict the noise. As will be appreciated by those skilled in the art, a Dense Block is a module used in convolutional neural networks that connects all layers directly with each other. Each layer obtains additional inputs from all preceding layers and passes on its own feature-maps to all subsequent layers.

As discussed earlier, the input 606 to DL network 601 is one image among a pair of NEX images e.g., $NEX_i$. Further, the DL network predicts additive noise 608 which then gets added to the input image 606 by an addition block 610 to generate an output image 612 which is the equivalent to the other image $NEX_j$ of the pair of the NEX images. In another embodiment, the DL network itself may predict the output image $NEX_j$. In such an embodiment, the pair of NEX images serve as input image and the target image for training the DL network.

In one embodiment, parameter values of Dense blocks 602, 604 are adjusted to reduce differences between the output of the DL network 601 i.e., noise 608 and target noise which is provided as another input to DL network 601 or determined as explained in equation 1. In one embodiment, a loss function is applied to the differences to adjust the parameter values of Dense blocks 602, 604. In another embodiment, the loss function may be a Mean absolute error (MAE) loss function measured as the average of sum of absolute differences between predicted target images. In other embodiments, the loss function may include other loss functions such as Mean Square Error loss function, mean bias error loss function, least squares loss function or least absolute deviations loss function. Further, in one embodiment, the filter sizes of the DL network are set as undefined to make the DL network as a size agnostic network.

Figure 7:
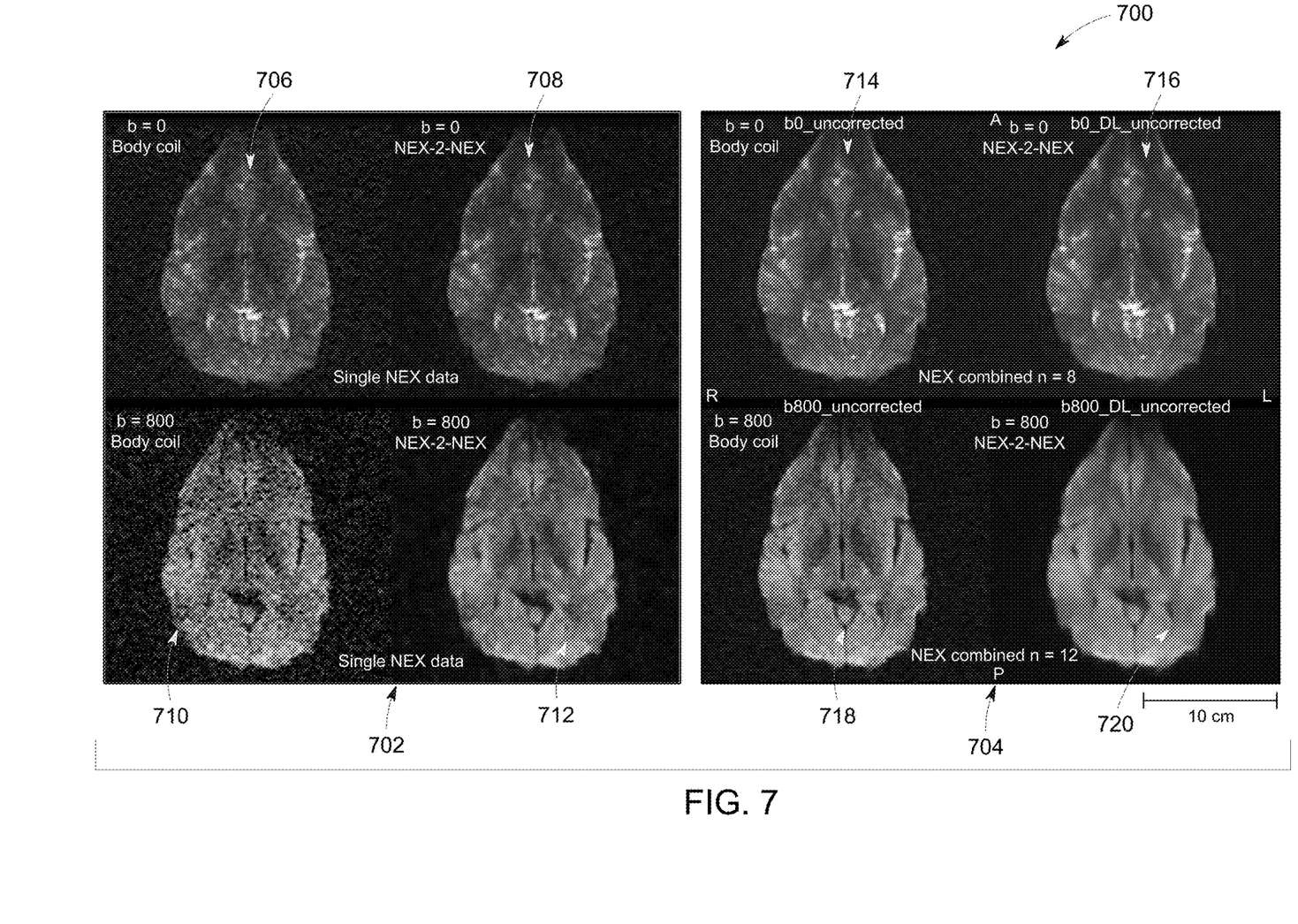
FIG. 7 is a schematic diagram depicting medical images generated by an MRI system in accordance with an embodiment of the present technique.

FIG. 7 shows a schematic diagram 700 depicting medical images generated by an MRI system (e.g., System 10 of FIG. 1) in accordance with an embodiment of the present technique. In general, FIG. 7 shows medical image sets 702, 704 corresponding to single NEX image data and the plurality of NEX images data respectively. Further, in the set 702, top images 706 and 708 correspond to the b value which is equal to zero i.e., b=0 and bottom images 710 and 712 correspond to the b value which is equal to 800 i.e., b=800. The left-hand side (LHS) images 706 and 710 correspond to images generated without denoising by the DL network and right-hand side (RHS) images 708 and 712 correspond to images generated with denoising by the DL network. It can be seen that images 708 and 712 which are denoised with DL network have reduced artifacts or noise compared to images 706 and 710.

Moreover, in the set 704, LHS images 714 and 718 correspond to images generated without denoising by the DL network and RHS images 716, 720 correspond to images generated with denoising by the DL network. The top images 714 and 716 correspond to the b value equal to zero and bottom images 718 and 720 correspond to the b value equal to 800. The image 716 is generated from the DL network trained with 8 NEX images data i.e., (n=8) and image 720 is generated from the DL network trained with 12 NEX images data i.e., (n=12). It can be seen that images 716 and 720 have reduced artifacts or noise compared to images 714 and 718. It can also be seen that images 716 and 720 which are generated with DL network trained with plurality of NEX images data have better quality compared to the images 708 and 712 which are generated with DL network trained with single NEX image data.

Figure 8:
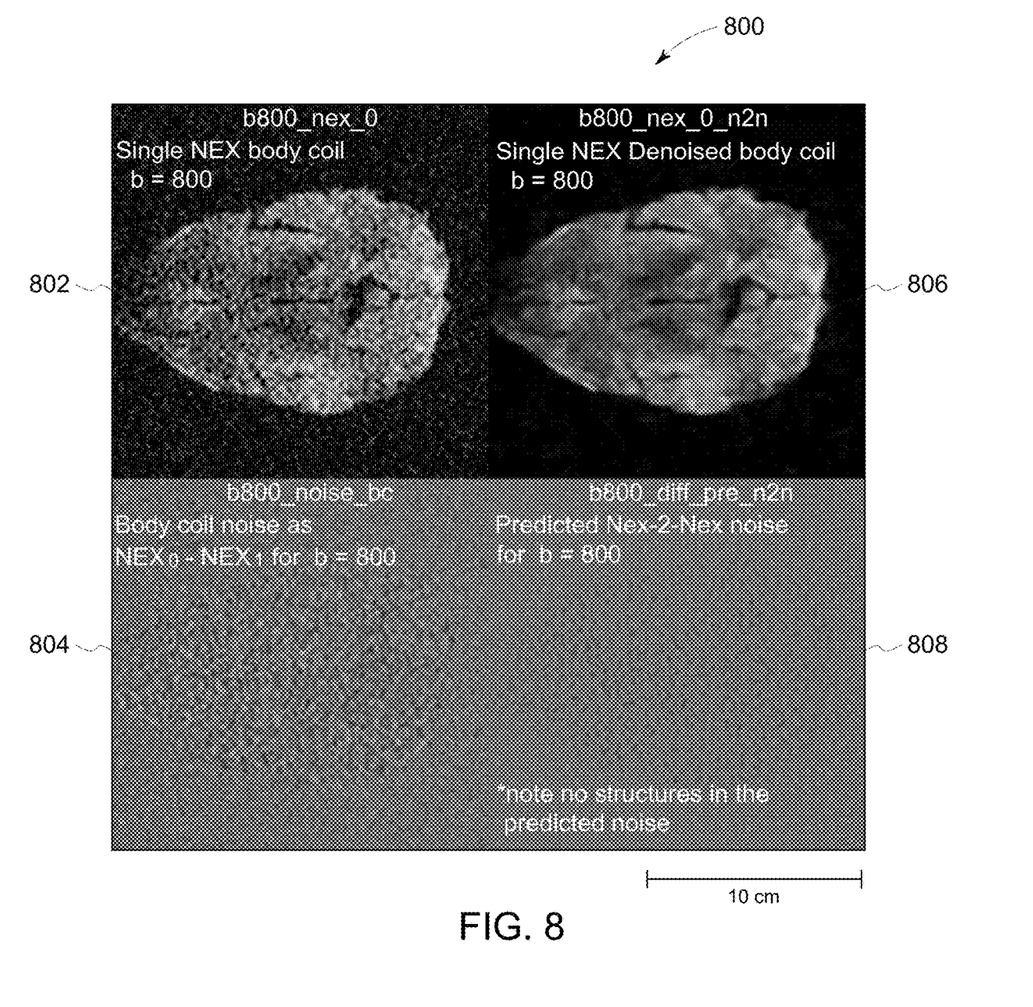
FIG. 8 is a schematic diagram depicting medical images for diffusion weighted imaging (DWI) of an object in accordance with an embodiment of the present technique.

FIG. 8 shows a schematic diagram 800 depicting medical images for diffusion weighted imaging (DWI) of an object in accordance with an embodiment of the present technique. In general, FIG. 8 shows a single NEX body coil image 802 and corresponding noise in image 804. Further, FIG. 8 shows a single NEX denoised body coil image 806 generated in accordance with the present technique and corresponding noise in image 808. All these images are for b value equal to 800. As can be seen, the denoised image 806 is much cleaner compared to image 802. The same effect can also be seen in the noise image 808 which does not have any structures like noise image 804 but just pure noise.

Figure 9:
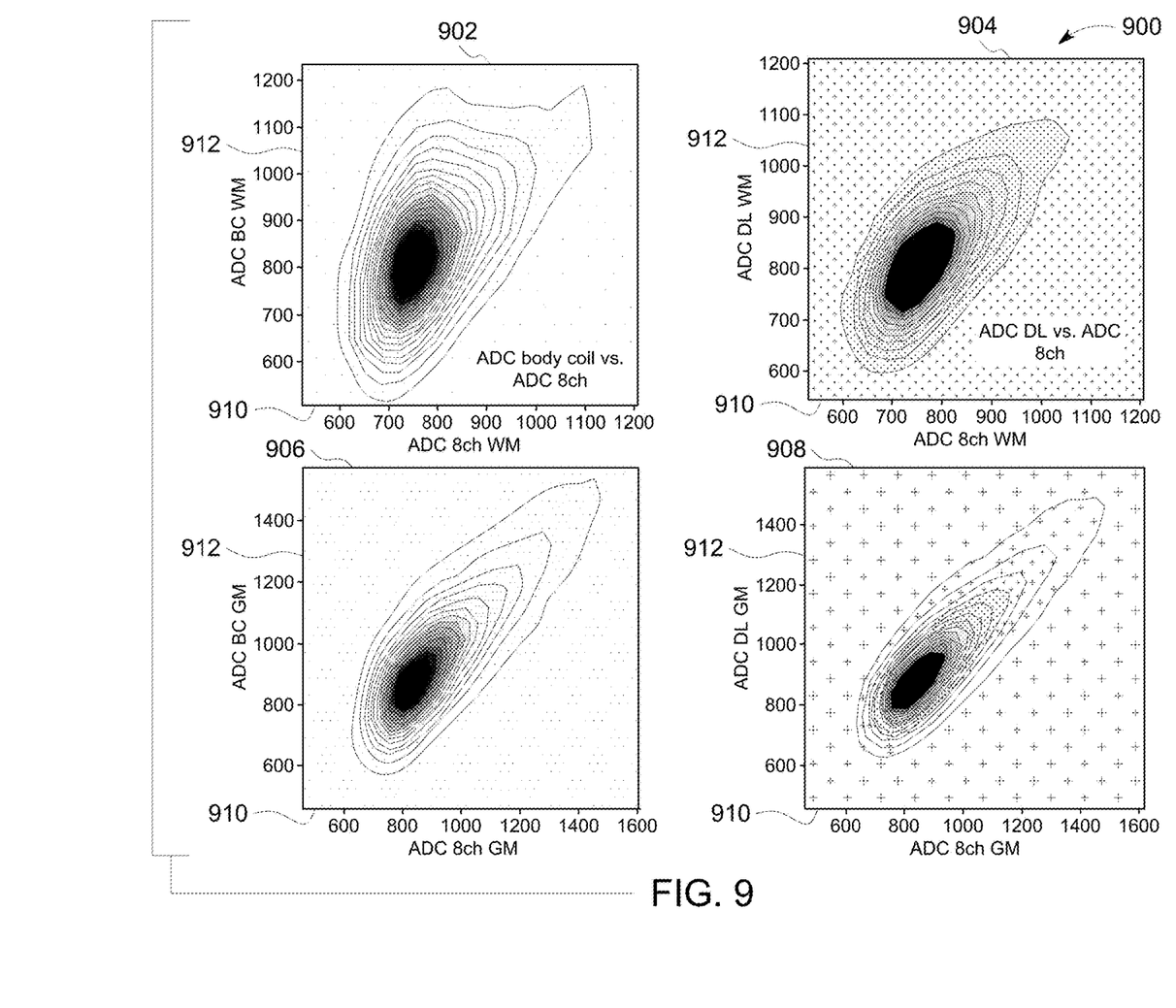
FIG. 9 is a schematic diagram depicting Apparent diffusion coefficient (ADC) map comparing body coil images before and after denoising in accordance with an embodiment of the present technique.

FIG. 9 shows a schematic diagram 900 depicting Apparent diffusion coefficient (ADC) map comparing body coil images before and after denoising in accordance with an embodiment of the present technique. As will be appreciated by those skilled in the art ADC represents water diffusivity in tissues from DWI. In general, FIG. 9 shows 4 plots, plot 902, plot 904, plot 906 and plot 908. In each of the plots 902-908, a horizontal axis 910 represents a good image value and a vertical axis 912 represents noise image value. Plots 902 and 904 correspond to one type of brain tissue (e.g., white matter) whereas plots 906 and 908 correspond to another type of brain tissue (e.g. gray matter). Further, plots 902 and 906 correspond to the body coil image before denoising whereas plots 904 and 908 correspond to the body coil image after denoising. Ideally the ADC maps should be such that it is linear or a straight line i.e., the noise image value 912 should increase in direct correlation with the good image value 910. However, as can be seen the body coil images before denoising (plots 902 and 906) do not follow that trend because they contain more noise. Body coil images before denoising (plots 904 and 908), although, do not follow the ideal trend, they are narrower compared to the plots 902 and 906 as they contain reduced noise or artifacts.

Figure 10:
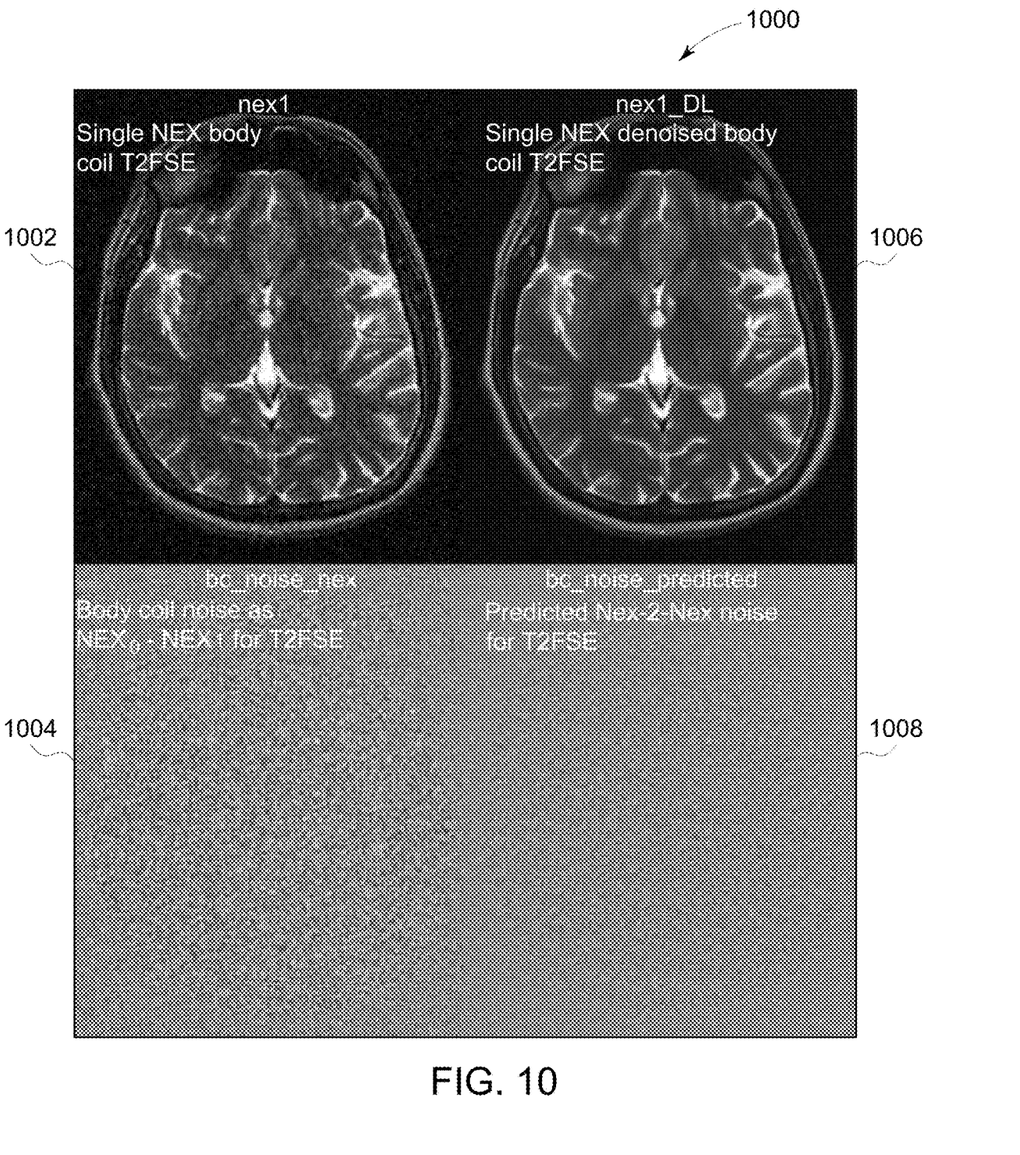
FIG. 10 is a schematic diagram depicting medical images for T2 fast spin-echo (T2FSE) MRI of an object in accordance with an embodiment of the present technique.

It should be noted that results from FIGS. 7 to 9 correspond to DWI MRI technique. However, the present technique is equally applicable to any other MRI techniques such as a structural MRI. FIG. 10 shows a schematic diagram 1000 depicting medical images for T2 fast spin-echo (T2FSE) MRI of an object in accordance with an embodiment of the present technique. In general, FIG. 10 shows a single NEX body coil image 1002 and corresponding noise in image 1004. Further, FIG. 10 shows a single NEX denoised body coil image 1006 generated in accordance with the present technique and corresponding noise in image 1008. As can be seen, the denoised image 1006 is much cleaner compared to image 1002. The same effect can also be seen in the noise image 1008 which does not have any structures like noise image 1004 but just pure noise The advantages of the present technique include specific MR noise realizations using deep learning. This enables improving image quality without compromising the MR image features (no structure blurring and image intensity). The proposed method can provide cutting edge advantage to value MR system propositions like Gaussline MR systems where data is acquired using compromised hardware specs. The DL driven techniques as proposed can help deliver high IQ MR images from such systems.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A medical imaging system comprising:
at least one medical imaging device providing image data of a subject;
a processing system programmed to:
train a deep learning (DL) network using a plurality of training images to predict noise in input data, wherein the plurality of training images includes a plurality of excitation images acquired for each line of k-space training data;
use the trained DL network to determine noise in the image data of the subject; and
generate a denoised medical image of the subject having reduced noise based on the determined noise in the image data;
wherein the plurality of excitation images includes at least one pair of excitation images;
wherein the processing system is programmed to train the DL network using input image data and target image data; and
wherein the input image data includes at least one of the excitation images of the at least one pair and the target image data includes at least one target noise signal derived from difference of two excitation images of the at least one pair.

2. The medical imaging system of claim 1, wherein generating the denoised medical image comprises subtracting the noise of the image data from the image data of the subject.

3. The medical imaging system of claim 1, wherein the DL network includes two cascaded Dense Blocks to predict noise in the input image.

4. The medical imaging system of claim 3, wherein the target noise is a realization of the true noise present in the input image.

5. The medical imaging system of claim 3, wherein an output image of the DL network is generated by adding the predicted noise in the input image.

6. The medical imaging system of claim 3, wherein parameter values of dense blocks are adjusted to reduce differences between the output of the DL network and the target image of the DL network.

7. The medical imaging system of claim 6, wherein a loss function is applied to the differences between the output of the DL network and the target image of the DL network to adjust the parameter values of Dense Blocks.

8. A method for imaging a subject comprising:
training a deep learning (DL) network using a plurality of training images to predict noise in input data, wherein the plurality of training images includes a plurality of excitation images acquired for each line of k-space training data using a magnetic resonance (MR) imaging device;
generating image data of the subject with the MR imaging device;
providing the image data of the subject as an input to the trained deep learning network model to determine noise in the image data of the subject;
generating a denoised medical image of the subject having reduced artifacts based on the determined noise in the image data;
wherein the plurality of excitation images includes at least one pair of excitation images;
wherein the DL network is trained using input image data and target image data; and
wherein the input image data includes at least one of the excitation images of the at least one pair and the target image data includes at least one target noise signal derived from difference of two excitation images of the at least one pair.

9. The method of claim 8, wherein the DL network includes two cascaded Dense Blocks to predict noise in the input image.

10. The method of claim 9, wherein the method further comprises adjusting parameter values of dense blocks to reduce differences between the output of the DL network and the target image of the DL network.

11. The method of claim 10, wherein adjusting the parameter values of the Dense Blocks comprises applying a loss function to assess DL input and output mismatch.

12. The method of claim 8, wherein generating the denoised medical image comprises subtracting the noise of the image data from the image data of the subject.

\* \* \* \* \*